(12) United States Patent
Chak

(10) Patent No.: US 8,141,832 B2
(45) Date of Patent: Mar. 27, 2012

(54) SNAP-ON HOOK AND COVER FOR SUNSHADE

(75) Inventor: Timothy Chak, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 12/754,207

(22) Filed: Apr. 5, 2010

(65) Prior Publication Data
US 2011/0240815 A1   Oct. 6, 2011

(51) Int. Cl.
*A47B 96/06* (2006.01)
(52) U.S. Cl. .............. 248/226.11; 248/231.71; 296/97.9
(58) Field of Classification Search ............. 248/226.11, 248/231.71; 296/97.9
See application file for complete search history.

(56) References Cited

U.S. PATENT DOCUMENTS

| | | | | |
|---|---|---|---|---|
| 5,297,321 | A * | 3/1994 | Murai | 24/600.4 |
| 5,358,299 | A | 10/1994 | Seto | |
| 5,411,310 | A | 5/1995 | Viertel et al. | |
| 5,507,545 | A | 4/1996 | Krysiak | |
| 5,560,669 | A * | 10/1996 | Gute | 296/97.9 |
| 5,732,916 | A * | 3/1998 | Gordon | 248/220.41 |
| 5,761,900 | A | 6/1998 | Presz, Jr. | |
| 5,868,370 | A * | 2/1999 | Nivet | 248/304 |
| 5,918,927 | A | 7/1999 | Renahy et al. | |
| 6,196,756 | B1 * | 3/2001 | Leverger | 403/326 |
| 6,231,109 | B1 | 5/2001 | Beaver | |
| 6,322,126 | B1 | 11/2001 | Kraus | |
| 6,324,732 | B1 | 12/2001 | Arisaka et al. | |
| 6,336,672 | B2 | 1/2002 | Beaver | |
| 6,368,009 | B1 * | 4/2002 | Noda | 403/329 |
| 6,491,333 | B2 | 12/2002 | Ichikawa et al. | |
| 6,607,233 | B1 | 8/2003 | Beaver et al. | |
| 6,863,331 | B2 * | 3/2005 | Beaver et al. | 296/97.9 |
| 6,994,504 | B2 * | 2/2006 | Gordon | 411/508 |
| 7,226,023 | B2 | 6/2007 | Banno et al. | |
| 7,415,751 | B2 * | 8/2008 | Kato et al. | 24/289 |
| 7,438,341 | B1 | 10/2008 | Olson, Jr. | |
| 7,534,134 | B2 * | 5/2009 | Qiu | 439/527 |
| 7,798,552 | B2 * | 9/2010 | Takai | 296/97.9 |
| 2001/0007394 | A1 | 7/2001 | Beaver | |
| 2009/0039669 | A1 | 2/2009 | Takai | |

FOREIGN PATENT DOCUMENTS

| | | |
|---|---|---|
| FR | 2 588 515 | 4/1987 |
| JP | 4 110224 | 10/1992 |
| JP | 5 96953 | 4/1993 |

\* cited by examiner

*Primary Examiner* — Terrell McKinnon
*Assistant Examiner* — Daniel J Breslin
(74) *Attorney, Agent, or Firm* — Fay Sharpe LLP

(57) ABSTRACT

A one-piece molded holder clip is provided for retaining an associated sunshade rod. The clip has a body in which a hook element is formed with the body and having a generally C-shaped conformation to receive the rod therein. A sunshade guide surface is formed in the body and extends substantially tangentially from the hook element. A fastener is formed with the body and extends from a rear surface of the sunshade guide surface. First and second legs are received over a bracket extending from the automotive vehicle frame and at least one of the legs includes a locking tab dimensioned for snap-fit engagement with an associated bracket. A cover is formed with the one-piece body and extends from the hook element, and covers the fastener to provide an aesthetically pleasing design.

17 Claims, 3 Drawing Sheets

SNAP-ON HOOK AND COVER FOR SUNSHADE

BACKGROUND OF THE DISCLOSURE

This disclosure relates to a combined hook and cover assembly for a sunshade, and more particularly to a one-piece hook and cover combination which is also referred to as a holder clip. For purposes of this application, a sunshade is a screen (often retractable) that is typically used to shade a rear window associated with a rear seat while a sun visor is mounted in front of the driver and/or front seat passenger.

Current designs of a sunshade hook and cover use two separate components, namely, a hook and a separate cover that is subsequently joined with the hook. A bracket extends from the vehicle, and the hook is secured to the bracket. For example, in one commercial arrangement, the hook has a hollow post that is clipped to the bracket. Once that connection is complete, the cover is then secured over the bracket and hook, and a separate retaining member such as a post is placed between the hollow post and the sunshade hook in order to connect together the multiple components.

Although the present design has been commercially successful, areas for improvement have been noted. First, more tooling is required for procurement, i.e., one set of tooling for manufacturing each component or part. Because the components are separately formed, there is a possibility that subsequent joining of the individual components will be impacted by a color mismatch. Thus, even under carefully controlled manufacturing conditions, variability exists from one manufacturing batch to another and from one component to another. Therefore, when separately manufactured components are subsequently assembled, any potential color mismatch is emphasized due to the side-side relationship of the different components in the assembly.

On the assembly line, each component typically has its own tote or bin in which like components are stored. A reduced number of components and less clutter in the assembly area is helpful for assembly line personnel, i.e., reducing the number of components likewise reduces the number of separate totes. Further, the components are each individually relatively small, and thus more difficult to handle and assemble. Still further, minimizing the number of different components required in inventory is important, and likewise reducing the number of different components for spare part distribution is also important.

There is also an increased possibility of poor fit and finish where separate components are subsequently assembled together. Likewise, a slightly larger product is an inherent result of using two components and there is less versatility because of the specialized individual aspects of and associated required size for each component.

For example, one known design included a hook component having four-post, hollow clip-in design. Likewise, the separate cover had a clip-in post that was inserted into a hollow space provided in the sunshade hook. Due to ergonomic concerns, the post sizes were limited for better insertion force. Unfortunately, limiting the size of the post makes the components more susceptible to breakage.

Accordingly, a need exists for an alternative holder clip design that overcomes one or more of these issues in providing a one-piece, simplified design that has greater versatility and eliminates problems associated with color and separate part mismatch.

SUMMARY OF THE DISCLOSURE

A one-piece holder clip includes a hook and an integrated cover where the one-piece clip can be snap-fit to an associated bracket using a single snap-fit connection.

More particularly, the one-piece holder clip for retaining an associated sunshade rod includes a body and a hook element formed with the body. The hook element has a proximal portion extending from a first surface of the body, and a distal portion protruding outwardly in a generally C-shaped cross-sectional conformation. The conformation of the hook element forms an entrance opening dimensioned to receive the associated sunshade rod in snap-fit relation. A sunshade guide surface is formed on the body and extends tangentially from the hook element proximal portion. Along with the hook element, the guide surface forms an entrance opening into the hook element. A fastener is formed with the body and extends from a rear surface of the guide surface. The fastener is a female recess defined by first and second leg portions, the first leg including a locking tab extending toward the second leg and at least the first leg includes an undercut shoulder for snap-fit engagement with an associated bracket. A cover is formed with the body and extends from adjacent the proximal portion of the hook element.

Preferably the fastener recess extends substantially perpendicular to the entrance opening of the hook element.

Preferably the fastener has a width that is substantially similar to a width of the hook element.

The cover extends from the guide surface and forms a hollow cavity, and in a preferred arrangement the cover extends from three contiguous edges of the guide surface.

An associated method of forming a one-piece holder clip includes molding a body, forming a hook element having a proximal portion and a distal portion that together define a generally C-shaped cross-sectional conformation that forms an entrance opening and hook element. The method includes forming a sunshade guide surface with the body that extends generally tangentially from the hook element proximal portion in spaced opposing relation to the distal portion of the hook element. The method further includes forming a fastener with first and second leg portions forming a recess therebetween with a locking tab extending from at least the first leg toward the second leg, the locking tab including an undercut shoulder. The method further includes forming a cover with the body to extend from adjacent the proximal portion of the hook element.

A primary benefit of the present disclosure relates to the reduced number of components.

Another feature relates to eliminating color match issues associated with separate components, and also eliminating imprecision associated with separate components.

Still another advantage is associated with the reduced costs associated with inventory, assembly, spare parts, and tooling to form the component.

Still other benefits and advantages of the present disclosure will become apparent to those skilled in the art upon reading and understanding the following, detailed description.

DETAILED DESCRIPTION OF THE PREFERRED EMBODIMENTS

Figure 1:
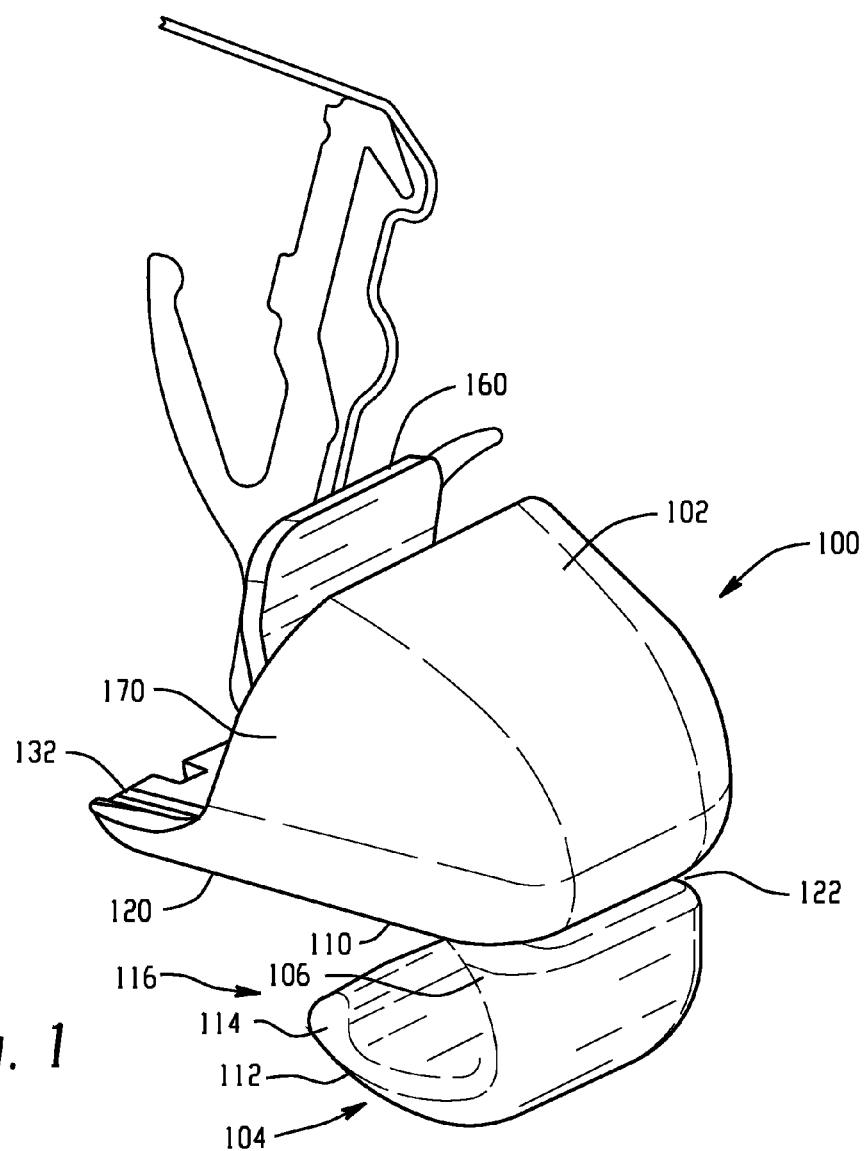
FIG. 1 is a perspective view of the one-piece snap-on hook and cover for a sunshade.

Turning first to FIG. 1, there is generally shown a one-piece molded holder clip 100 for retaining an associated sunshade rod (not shown). The clip 100 includes a body 102 which in this instance comprises the entire clip because the body is a one-piece molded structure preferably formed from a homogenous or same material throughout. A hook element 104 is formed on the body and has a first or proximal portion 106 that extends from a first perimeter surface portion 110 of the body. More particularly, the first perimeter surface portion is located along a lower, front edge of the clip so that the proximal portion 106 generally defines a first leg of the hook element. The proximal portion 106 extends downwardly and away from the remainder of the body and transitions into a second or distal portion 112. The second portion 112 forms a second leg which is substantially perpendicular to the first leg 106. Thus in cross-section (FIG. 2), the first and second legs 106, 112 form a generally C-shaped conformation having an outer terminal end 114. The second portion 112 extends in spaced relation relative to a sunshade guide surface 120. Particularly, the sunshade guide surface is also formed with the body and extends along a lower perimeter of the body in generally tangential relation with the proximal portion of the hook element where the hook element merges into a remainder of the body. In conjunction with the second portion 112 of the hook element 104, the guide surface 120 aligns or guides an associated sunshade rod R (FIG. 2), if abuttingly engaged by the rod R, to move relative to the body through an entrance opening 116 in the hook element. As the rod R proceeds through the entrance opening 116, the rod snap-fits into connection as is generally known in the art. There is a line of demarcation 122 that is purposely formed between the hook element and the remainder of the body 102. This line of demarcation 122 adds to the aesthetics of the body and also assists the automotive vehicle occupant in discerning proper location of the hook element and in order to align the associated sunshade rod with the clip, and particularly the hook element thereof.

Figure 5:
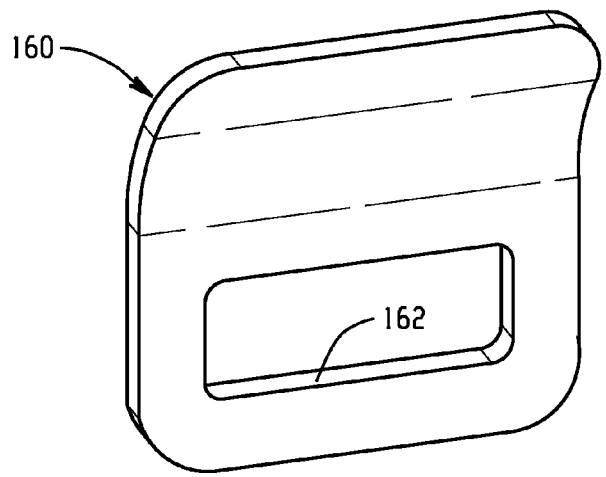
FIG. 5 is an enlarged perspective view of the bracket to which the hook and cover component is secured.
Figure 2:
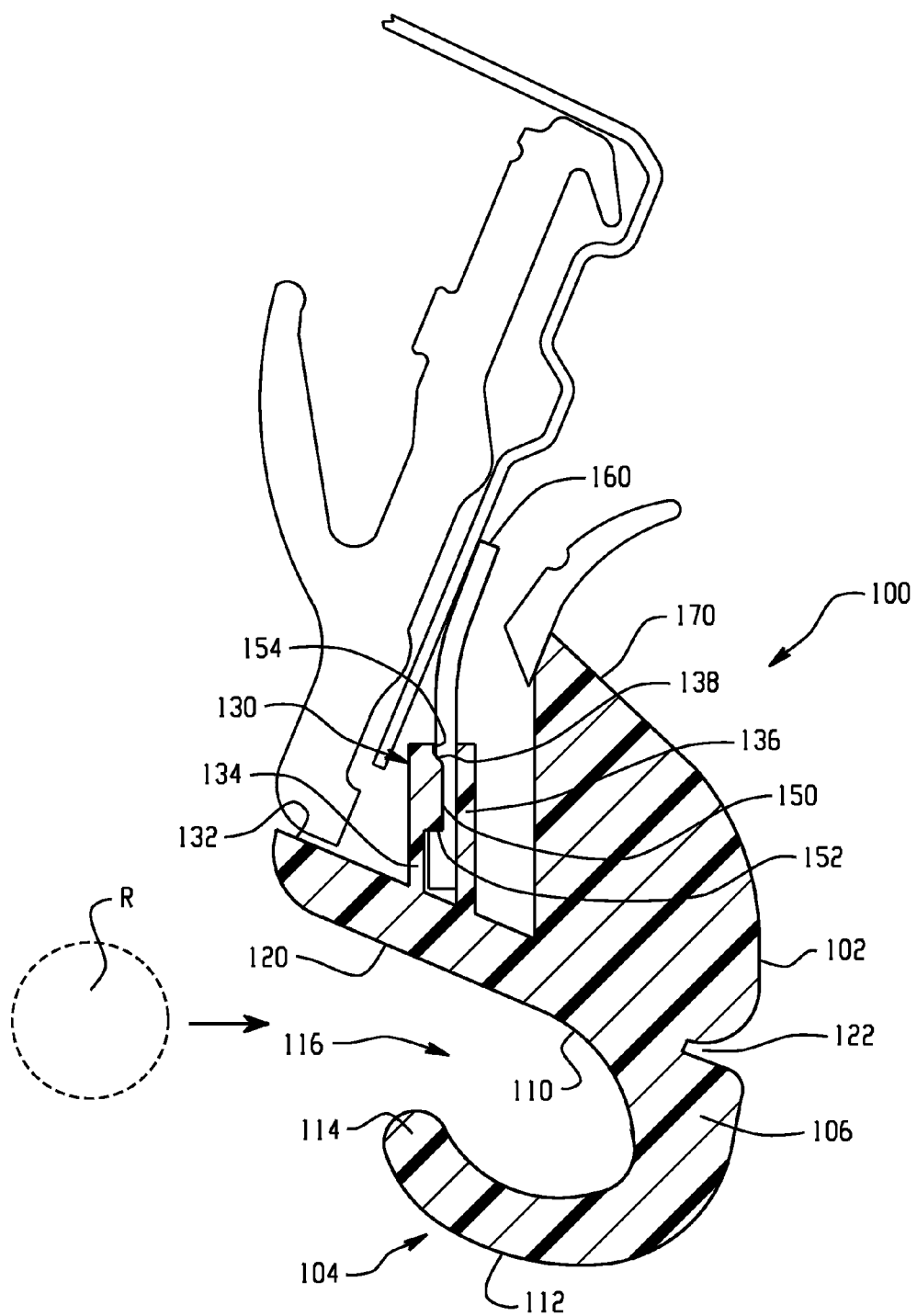
FIG. 2 is a longitudinal cross-sectional view of the one-piece hook and cover secured to the bracket and vehicle taken generally along lines 2-2 of FIG. 4.

The one-piece molded clip also includes a fastener 130 that extends from a second or rear surface 132. As perhaps best illustrated in FIGS. 2 and 3, the fastener 130 preferably includes first and second legs 134, 136 that extend in substantially parallel relation to one another and in a substantially perpendicular orientation from the rear surface 132. The legs 134, 136 are spaced apart to form a recess 138. More particularly, at least one of the legs, shown here as the first leg 134, includes a locking tab 150 that extends toward the second leg and includes an undercut shoulder 152 that cooperates with bracket 160 (FIG. 5) and more particularly with an opening 162 in the bracket. Thus, as shown in FIG. 2, when assembled to the vehicle, the one-piece molded clip 100 is secured via the fastener over the bracket which, in turn, is secured to the vehicle. Preferably, a tapered lead surface 154 on the tab resiliently deflects the first leg away from or outwardly relative to the second leg to accommodate the thickness of the bracket. The one-piece molded clip 100 is then further advanced relative to the bracket 160 until the tab, and particularly the undercut shoulder 152, snap-fits into the opening 162 of the bracket to secure the clip 100 via the fastener 130 to the bracket 160.

As is evident in the exemplary embodiment, the recess is approximately 90° or perpendicular to the entrance opening 116 of the hook element 104. Further, the fastener 130 is preferably located close to the entrance opening so that when the rod R is advanced through the entrance opening 116, the entire one-piece molded clip 100 is able to effectively resist the snap-fit forces and thereby allow the hook element 104 to deflect as the second portion 112 elastically enlarges or flexes to accommodate the rod. Once the rod R snap-fits into engagement with the hook element 104, the outer terminal end 114 retains the rod in a clipped position until such time as the rod is removed therefrom. Stated another way, the hook element 104 grasps or encircles a substantial portion of the perimeter of the rod to allow the rod R to pivot relative to the one-piece molded clip. When the automotive vehicle occupant decides to move the sunshade to block light through a side window, the sunshade is deployed and rod is inserted through the entrance opening 116.

The cover 170 is also preferably formed with the body 102 and extends from adjacent the proximal portion 106 of the hook element and above the line of demarcation 122. The cover of the illustrated embodiment extends outwardly along three contiguous edges of the body (FIG. 3) to form an internal cavity 172. Preferably, the cover 170 also extends a height that is sufficient to cover the interconnection of the fastener 130 with the bracket 160 (FIG. 2). In this manner, once the one-piece molded clip 100 is secured to the vehicle bracket 160 by the fastener 130, the interconnection is not evident to the automotive vehicle occupants.

Figure 3:
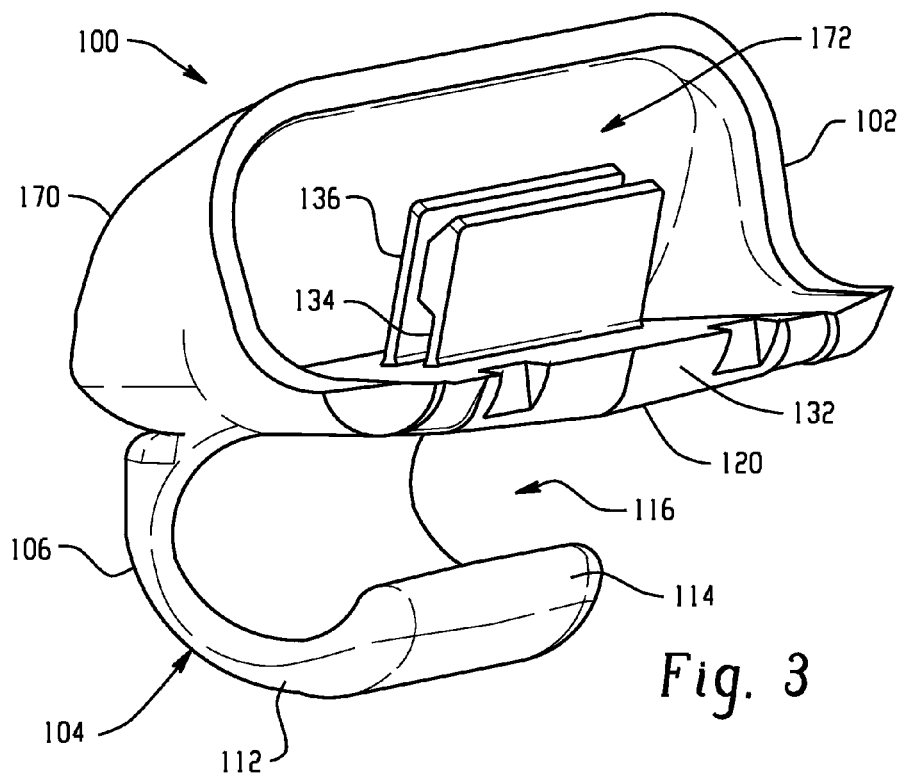
FIG. 3 is an enlarged perspective view of the one-piece hook and cover.
Figure 4:
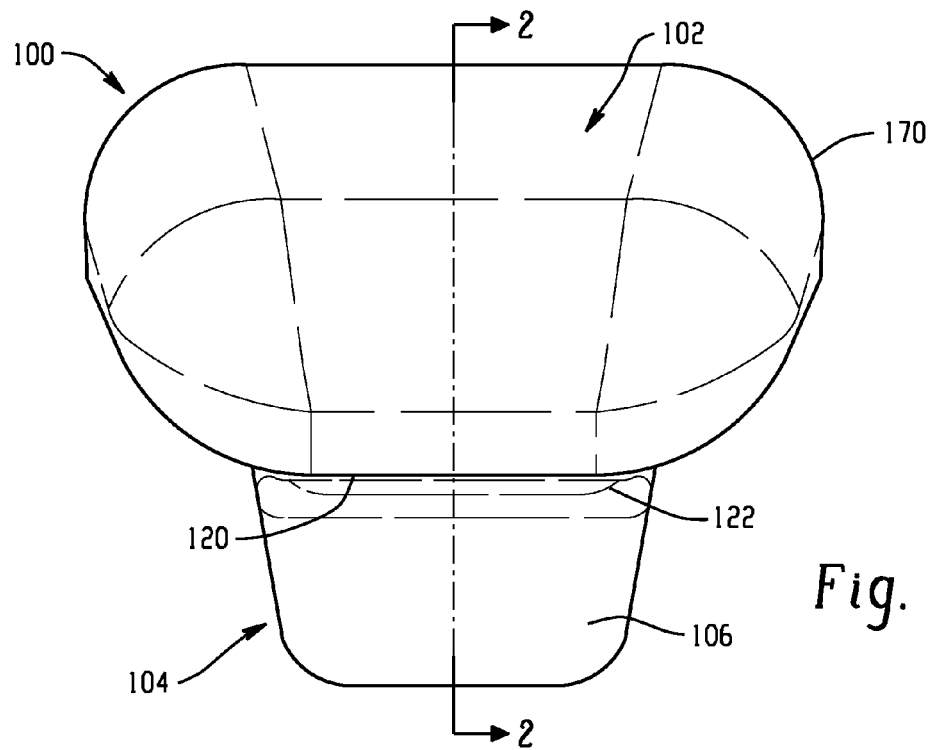
FIG. 4 is an end view of the snap-fit hook and cover.

As is also shown in FIG. 3, the fastener 130 preferably has a width that is substantially similar to the width of the hook element 104. Although these relative dimensions may be varied, a desirable aspect of the one-piece molded clip 100 with the integrated fastener 130 is that the fastener can be enlarged so that the fastener securely retains the molded clip in place.

As a result, the preferred embodiment described above provides a one-piece design with an integrated, single fastener. By molding the one-piece molded clip as a single piece, there are fewer components and issues with color mismatch are avoided. The hook retention strength can be increased by simply increasing the clip size. Moreover, even when dealing with mass production tooling, changes are simple and only require removal of material from the associated manufacturing mold in order to increase the clip size during manufacture. By manufacturing the snap-on hook and cover as a single component, only one tote is required on the assembly line. Moreover, the simple snap-in design does not require an assembly worker to assemble two pieces separately, and the one piece molded clip is much easier to install than prior arrangements. The plastic hooks are also, generally speaking, a high inventory item, and as a result of the one-piece molded clip, the design requires additional storage or inventory for only a single part instead of multiple components. As alluded to above, the design is much more versatile than prior arrangements, and the cover does not have to be fitted separately. Likewise, a consistent fit and finish is provided with associated improved aesthetics.

The disclosure has been described with reference to the preferred embodiments. Modifications and alterations will occur to others upon reading and understanding this specification. It is intended to include all such modifications and alterations in so far as they come within the scope of the appended claims or the equivalents thereof.

I claim:

1. A one-piece molded holder clip for retaining an associated rod comprising:
   a body having a perimeter surface;
   a hook element formed with the body and having a proximal portion extending from a portion of the body perimeter surface and a distal portion protruding outwardly in a generally C-shaped cross-section to form an entrance opening in the hook element dimensioned to receive the associated rod in snap-fit relation;

a guide surface formed with the body and extending substantially tangentially from the hook element proximal portion along a second portion of the body perimeter surface in spaced, opposing relation to the distal portion of the hook element for guiding the associated rod therealong and aligning the associated rod with the entrance opening in the hook element;

a fastener formed with the body extending from a rear surface of the guide surface and having a female recess defined by first and second leg portions, the first leg including a locking tab extending toward the second leg with an undercut shoulder dimensioned for snap-fit engagement with an associated bracket; and a cover formed with the body extending from adjacent the proximal portion of the hook element, wherein the cover extends outwardly from the guide surface in the same direction as the fastener a greater dimension than the fastener.

2. The one-piece molded holder clip of claim 1 wherein the distal end of the hook element includes an in-turned terminal end defining the entrance opening in the hook element.

3. The one-piece molded holder clip of claim 1 wherein the fastener extends substantially perpendicular from the rear surface of the guide surface.

4. The one-piece molded holder clip of claim 3 wherein the fastener female recess extends substantially perpendicular to the entrance opening of the hook element.

5. The one-piece molded holder clip of claim 1 wherein the fastener female recess extends substantially perpendicular to the entrance opening of the hook element.

6. The one-piece molded holder clip of claim 1 wherein the fastener has a width that is substantially similar to a width of the hook element.

7. The one-piece molded holder clip of claim 1 wherein the cover extends from the guide surface and forms a hollow cavity.

8. A molded holder clip and bracket combination for retaining an associated sunshade rod on an associated vehicle, the combination comprising:

a one-piece molded holder clip having
a body with a hook element extending outwardly from a first perimeter surface portion of the body in a generally C-shaped cross-section to form an entrance opening between the hook element and perimeter surface portion dimensioned to receive the associated sunshade rod in snap-fit relation, a sunshade guide surface formed with the body and extending substantially tangentially from an interconnection of the hook element with the body perimeter surface for guiding the associated sunshade rod therealong and aligning the associated sunshade rod with the entrance opening, a fastener formed with the body extending from a rear surface of the sunshade guide surface at a location substantially aligned with the entrance opening to resist snap-fit forces as the associated sunshade rod proceeds through the entrance opening, the fastener having a female recess defined by first and second leg portions, the first leg including a locking tab extending toward the second leg with an undercut shoulder, and dimensioned for snap-fit engagement with an associated bracket; and a cover formed with the body and generally covering the fastener; and a bracket secured to the associated vehicle and dimensioned for receipt between the first and second legs of the fastener.

9. The combination of claim 8 wherein the bracket includes an opening dimensioned to receive the locking tab of the first leg of the fastener.

10. The combination of claim 9 wherein the undercut shoulder engages the bracket along a portion of the opening.

11. The combination of claim 8 wherein one of the first and second fastener legs includes a tapered lead surface that resiliently flexes the fastener legs apart as the fastener legs are advanced relative to the bracket.

12. The combination of claim 11 wherein the locking tab snap-fits through an opening in the bracket to retain the clip and bracket together.

13. A molded holder clip for retaining an associated sunshade rod, the clip comprising:

a body having a perimeter surface with a hook element having a proximal portion extending outwardly from a portion of the body perimeter surface and extending in a generally C-shaped cross-section to a distal end that forms an entrance opening facing in a direction away from the proximal portion, and wherein the hook element is dimensioned to receive the associated sunshade rod in snap-fit relation;

a guide surface formed with the body and extending substantially tangentially from the interconnection of the hook element with the body perimeter surface for guiding the associated sunshade rod therealong and aligning the associated sunshade rod with the entrance opening;

a fastener formed as one-piece with the body and extending from a rear surface of the sunshade guide surface and having a female recess defined by first and second leg portions, the first leg including a locking tab extending toward the second leg with an undercut shoulder, and dimensioned for snap-fit engagement with an associated bracket;

a cover formed with the body and extending outwardly a greater dimension than and in the same direction as the fastener from the guide surface;

a line of demarcation formed between the hook element and the body along the cover to assist in aligning the associated sunshade rod with the entrance opening.

14. The molded holder clip of claim 13 wherein the distal end of the hook element includes an in-turned terminal end defining the entrance opening in the hook element.

15. The molded holder clip of claim 13 wherein the fastener extends substantially perpendicular from the rear surface of the guide surface.

16. The molded holder clip of claim 13 wherein the fastener has a width that is substantially similar to a width of the hook element.

17. The molded holder clip of claim 13 wherein the fastener is positioned at a location substantially aligned with the entrance opening to resist snap-fit forces as the associated sunshade rod proceeds through the entrance opening.

\* \* \* \* \*